(12) United States Patent
Proctor et al.

(10) Patent No.: US 8,417,659 B2
(45) Date of Patent: Apr. 9, 2013

(54) MULTI-RESULT SET CALCULATION SUPPORT IN RULE ENGINES

(75) Inventors: Mark Proctor, London (GB); Edson Tirelli, Montreal (CA)

(73) Assignee: Red Hat, Inc., Raleigh, NC (US)

(*) Notice: Subject to any disclaimer, the term of this patent is extended or adjusted under 35 U.S.C. 154(b) by 315 days.

(21) Appl. No.: 12/959,188

(22) Filed: Dec. 2, 2010

(65) Prior Publication Data

US 2012/0143812 A1 Jun. 7, 2012

(51) Int. Cl.
*G06F 17/00* (2006.01)

(52) U.S. Cl.
USPC ............................................................ 706/48

(58) Field of Classification Search ........................ None
See application file for complete search history.

(56) References Cited

U.S. PATENT DOCUMENTS

| | | | |
|---|---|---|---|
| 2007/0122001 A1* | 5/2007 | Wang et al. | 382/103 |
| 2009/0063385 A1* | 3/2009 | Proctor | 706/48 |
| 2009/0228421 A1* | 9/2009 | Citeau | 706/48 |

* cited by examiner

*Primary Examiner* — Jeffrey A Gaffin
*Assistant Examiner* — Mikayla Chubb
(74) *Attorney, Agent, or Firm* — Lowenstein Sandler LLP

(57) ABSTRACT

Some embodiments of a method to support multi-result set calculation in a rule engine have been presented. A rule engine can compile a set of rules to build a network for evaluating facts against the rules. The rules include at least one rule requiring multiple calculations to be executed for the same set of facts. The rule engine can create a single multi-result set calculation node for this rule in the network. The multi-result set calculation node can generate a set of results and add the set of results to a tuple to be propagated to a second node connected to an output of the multi-result set calculation node.

20 Claims, 17 Drawing Sheets

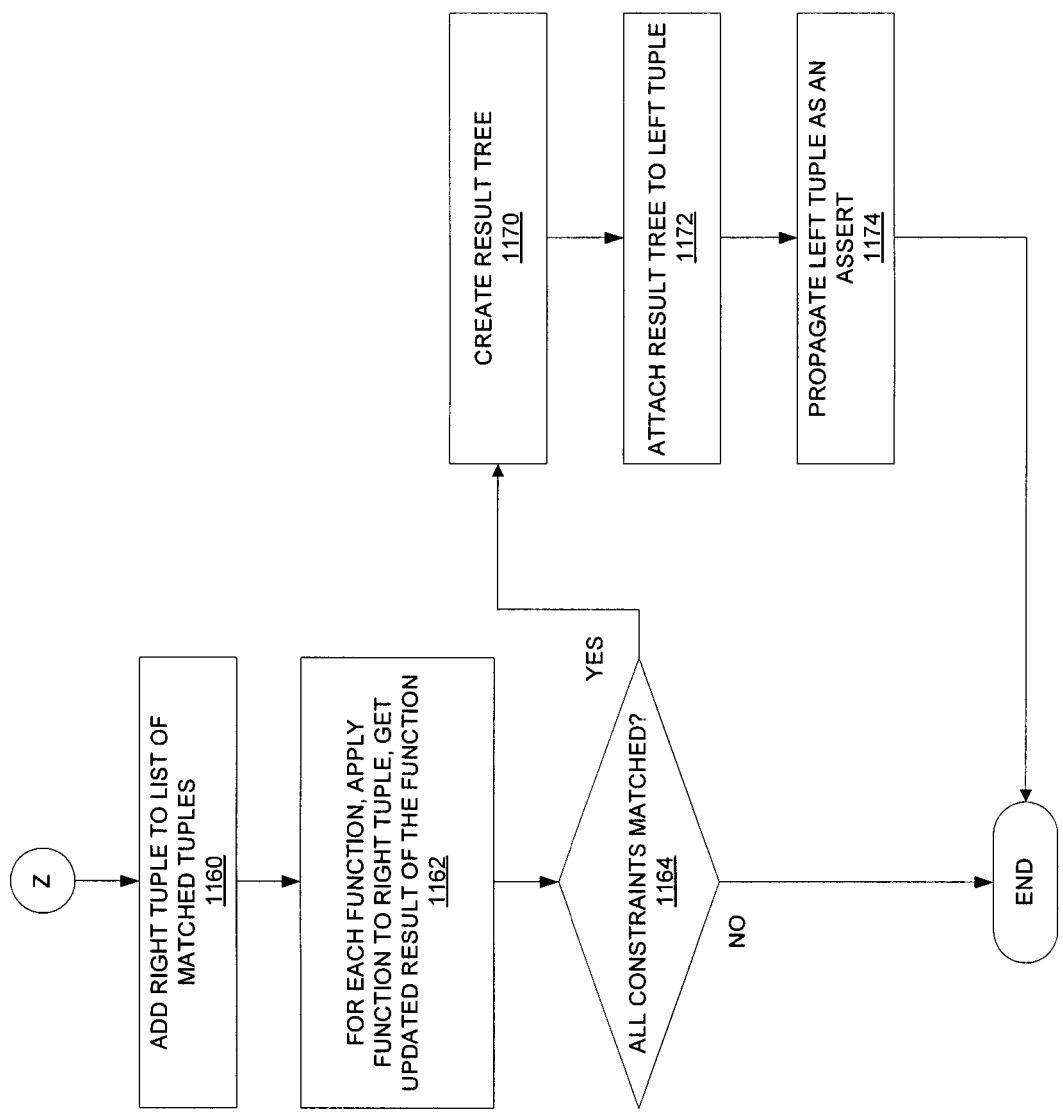

MULTI-RESULT SET CALCULATION SUPPORT IN RULE ENGINES

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts; or simply referred to as data). A rule is a logical construct for describing the operations, definitions, conditions, and/or constraints that apply to some predetermined data to achieve a goal. Various types of rule engines have been developed to evaluate and process rules. Conventionally, a rule engine implements a network to process rules and data objects, which are also referred to as facts. A network may include many different types of nodes, including, for example, object-type nodes, alpha nodes, left-input-adapter nodes, accumulate nodes, eval nodes, join nodes, not nodes, and terminal nodes, etc. Some conventional rule engines build Rete networks, and hence, are referred to as Rete rule engines.

Typically, data objects enter a network at the root node, from which they are propagated to any matching object-type nodes. From an object-type node, a data object is propagated to either an alpha node (if there is a literal constraint), a left-input-adapter node (if the data object is the left most object type for the rule), or a beta node (such as a join node). A set of facts matching a rule can be referred to as a tuple, which can be propagated from one node to another node.

A beta node has two inputs, unlike one-input nodes, such as object-type nodes and alpha nodes. A beta node can receive tuples in its left-input and data objects, or simply referred to as objects, in its right-input. Join nodes, not nodes, and exist nodes are some examples of beta nodes. All nodes may have one or more memories to store a reference to the data objects and tuples propagated to them, if any. For example, a beta node can have a left memory and a right memory associated with its left input and right input, respectively. The left-input-adapter node creates a tuple with a single data object and propagates the tuple created to the left input of the first beta node connected to the left-input-adapter node, where the tuple is placed in the left memory of the beta node and then join attempts are made with all the objects in the right memory of the beta node.

When another data object enters the right input of the join node, the data object is placed in the right memory of the join node and join attempts are made with all the tuples in the left memory of the join node. The tuples placed in the left memory of the join node are partially matched. If a join attempt is successful, the data object is added to the tuple, which is then propagated to the left input of the next node in the network. Such evaluation and propagation continue through other nodes down the network, if any, until the tuple reaches the terminal node. When the tuple reaches the terminal node, the tuple is fully matched. At the terminal node, an activation is created from the fully matched tuple and the corresponding rule. The activation is placed onto an agenda of the rule engine for potential firing or potential execution.

Conventional Rete networks does not explicitly define support for set operations, but several extensions have been developed in some rule engines to support them. For example, in Drools provided by Red Hat, Inc. of Raleigh, N.C., it is possible to define a rule that matches the sum of all items in a customer order by using the Accumulate Conditional Element (CE) as follows:

```
rule "Order statistics"
when
    $total : Number ( ) from accumulate (
        OrderItem( $amt : amount ),
        sum( $amt ) )
then
    // perform other operations
end
```

Although the previous approach works in some limited circumstances, it comes short when multiple calculations need to be executed for the same set of facts. For instance, if the previous rule would have to calculate not only the total, but also the minimum, average, and maximum item amount, then four (4) consecutive patterns would have to be used as follows:

```
rule "Order statistics"
when
    $total : Number ( ) from accumulate (
        OrderItem( $amt : amount ), sum( $amt ) )
    $avg : Number ( ) from accumulate (
        OrderItem( $amt : amount ), average( $amt ) )
    $min : Number ( ) from accumulate (
        OrderItem( $amt : amount ), min( $amt ) )
    $max : Number ( ) from accumulate (
        OrderItem( $amt : amount ), max( $amt ) )
then
    // perform other operations on $total, $avg, $min, and $max
end
```

This is not only verbose, but extremely inefficient. FIG. 1 shows the resulting Rete network for the above example. Note that the resulting Rete network 100 contains at least four accumulate nodes 111-114.

BRIEF DESCRIPTION OF THE DRAWINGS

The present invention is illustrated by way of example, and not by way of limitation, in the figures of the accompanying drawings and in which:

FIGS. 11A-11D illustrate one embodiment of a method to support right tuple modification.

DETAILED DESCRIPTION

Described herein are some embodiments of a method and an apparatus to support multi-result set calculations in a rule engine. In general, a rule engine processes data by evaluating data against a set of rules. Typically, the set of rules are in a rule file, which can be compiled and executed by a rule engine to evaluate data against the rules. The data includes data objects asserted in a working memory of the rule engine, which can also be referred to as facts.

In some embodiments, the rule engine compiles a rule file, which includes at least one rule requiring multiple calculations to be executed on the same set of facts. Based on the rule file, the rule engine can create a network to evaluate the rules in the rule file, such as a Rete network. For the rule requiring multiple calculations to be executed on the same set of facts, the rule engine creates a single multi-result set calculation node and inserts the node into an appropriate location within the Rete network. The multi-result set calculation node can generate a set of results by performing multiple calculations or functions on the same set of facts, and can add the results to a tuple, which is a data structure for holding a set of facts matching a particular rule. The tuple can be propagated to another node connected to an output of the multi-result set calculation node. The above approach provides an efficient way to perform multiple calculations on the same set of facts in a rule engine. More details of some embodiments of a method and an apparatus to support multi-result set calculations in a rule engine are described below.

Figure 1:
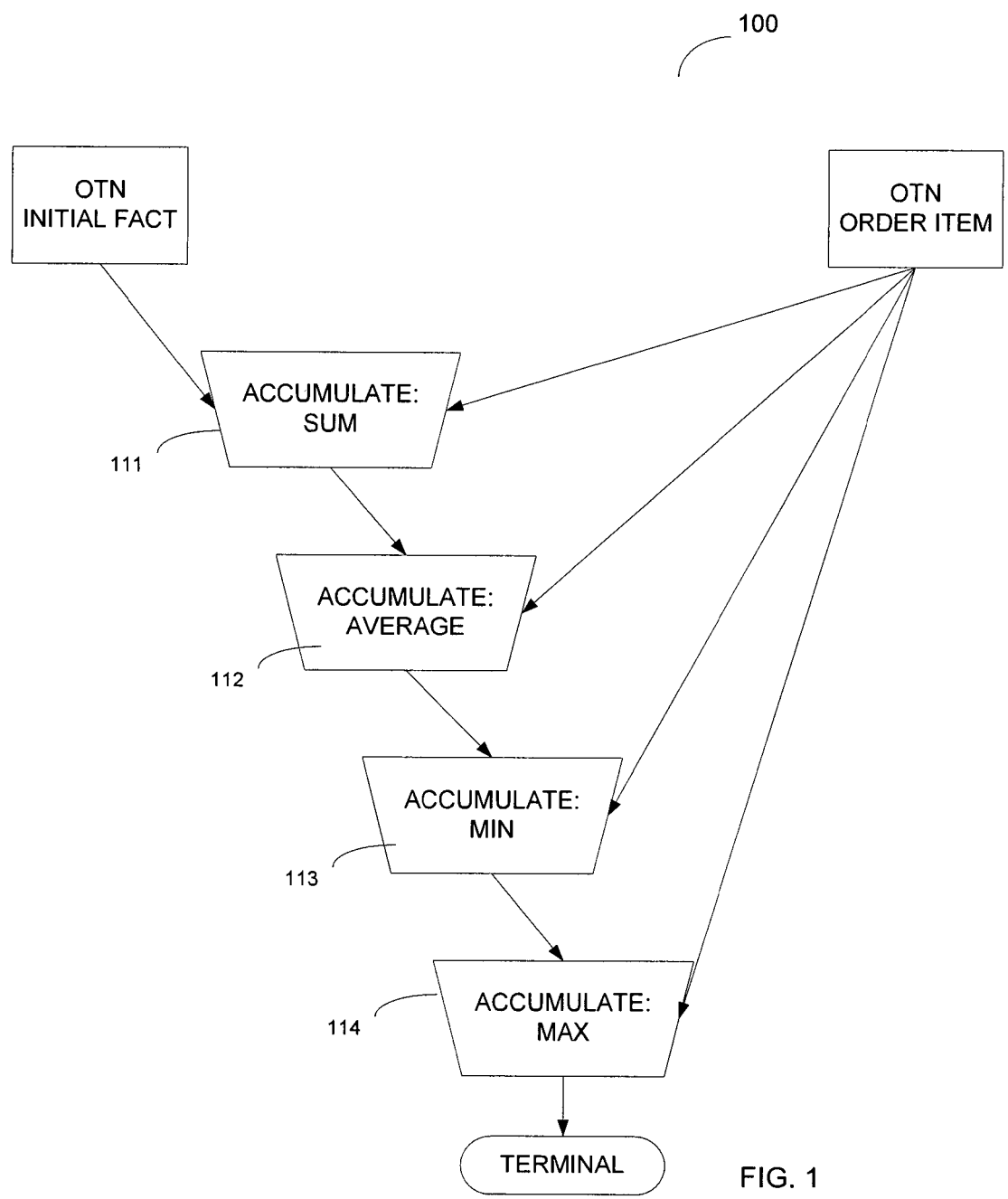
FIG. 1 illustrates a conventional simplified Rete network.
Figure 2:
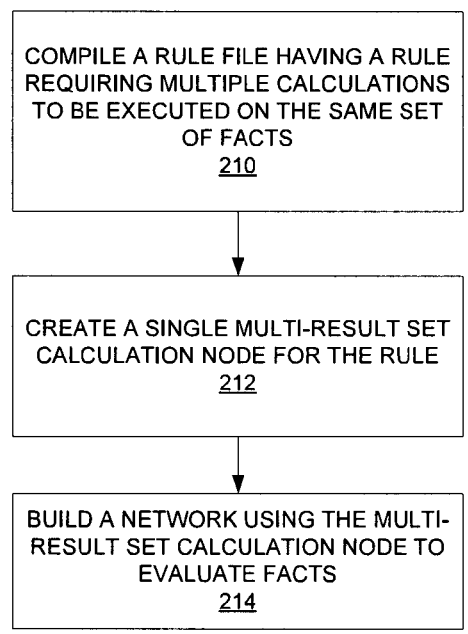
FIG. 2 illustrates one embodiment of a method to build a network to evaluate rules requiring multiple calculations on the same set of facts.

FIG. 2 illustrates one embodiment of a method for a rule engine to build a network to evaluate rules requiring multiple calculations on the same set of facts. Initially, the rule engine compiles a set of rules in a rule file (processing block 210). A user of the rule engine may provide the set of rules. For example, in a business application, the set of rules includes business rules pertaining to business transactions (e.g., medical insurance claim processing, mortgage application, etc.). Further, the set of rules includes a rule requiring multiple calculations, or functions, to be executed or performed on the same set of facts. For this rule, the rule engine may create a single multi-result set calculation node (processing block 212). In some embodiments, the multi-result set calculation node can be implemented using only one accumulate node. The multi-result set calculation node can generate a set of results by performing multiple calculations or functions on the same set of facts. Details of one embodiment of a multi-result set calculation node are discussed below with reference to FIG. 3. Finally, the rule engine builds a network (e.g., a Rete network) using the multi-result set calculation node for evaluating facts against the rules (processing block 214). Note that the network may include additional different types of nodes (such as object type nodes, left adaptor nodes, beta nodes, and alpha nodes, etc.), which are connected to each other in the network such that tuples containing data objects can be propagated from one node to another through the network when the data objects are matched at a respective node.

In some embodiments, the rule engine usable to perform the above method comprises processing logic implemented with hardware (e.g., circuitry, dedicated logic, programmable logic, microcode, etc.), software (such as instructions run on a processing device), firmware, or a combination thereof. For example, the rule engine may be executable on a processing device running in a computing machine (e.g., a personal computer (PC), a server, a laptop computer, a tablet computer, a personal digital assistant (PDA), a smart phone, etc.). The processing device can include one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The computing machine may further include machine-readable storage medium (a.k.a. computer-readable storage medium) coupled to the processing device, to store data (e.g., the node memories) and/or instructions. The machine-readable storage medium may include one or more of a read-only memory (ROM), a flash memory, a dynamic random access memory (DRAM), a static random access memory (SRAM), etc. In addition, the computing machine may include other components, such as a network interface device, a video display unit (e.g., a liquid crystal display (LCD), a touch screen, a cathode ray tube (CRT), etc.), an alphanumeric input device (e.g., a keyboard, a touch screen, etc.), a cursor control device (e.g., a mouse, a joystick, a touch screen, etc.), a signal generation device (e.g., a speaker), etc.

By extending the Rete network with a multi-result set calculation node, both the Rete network and the syntax or pattern of the rule requiring multiple calculations can be greatly simplified. In some embodiments, the multi-result set calculation node can be implemented with an extension of an accumulate node that supports applying multiple functions to the same set of data. In some embodiments, several changes to the accumulate node, both in syntax and internal algorithm, are made to accommodate multiple calculations. For instance, one change is that the modified accumulate node no longer adds one element to a tuple, but several elements instead. So, from a pure syntactical perspective, the result type of the functions may not be defined to be an arbitrary type. Also, the accumulate node has to be extended to support several functions for the set, and be possible to label each function for future reference of its result. For example, a rule requiring calculation of a total, a minimum, a maximum, and an average item amount can be written as follows:

```
rule "Order statistics"
when
    accumulate( OrderItem( $amt : amount ),
        $total : sum ( $amt ),
        $avg : average( $amt ),
        $min : min( $amt ),
        $max : max( $amt ) )
then
    // other operations with $total, $avg, $min, $max
end
```

Figure 3:
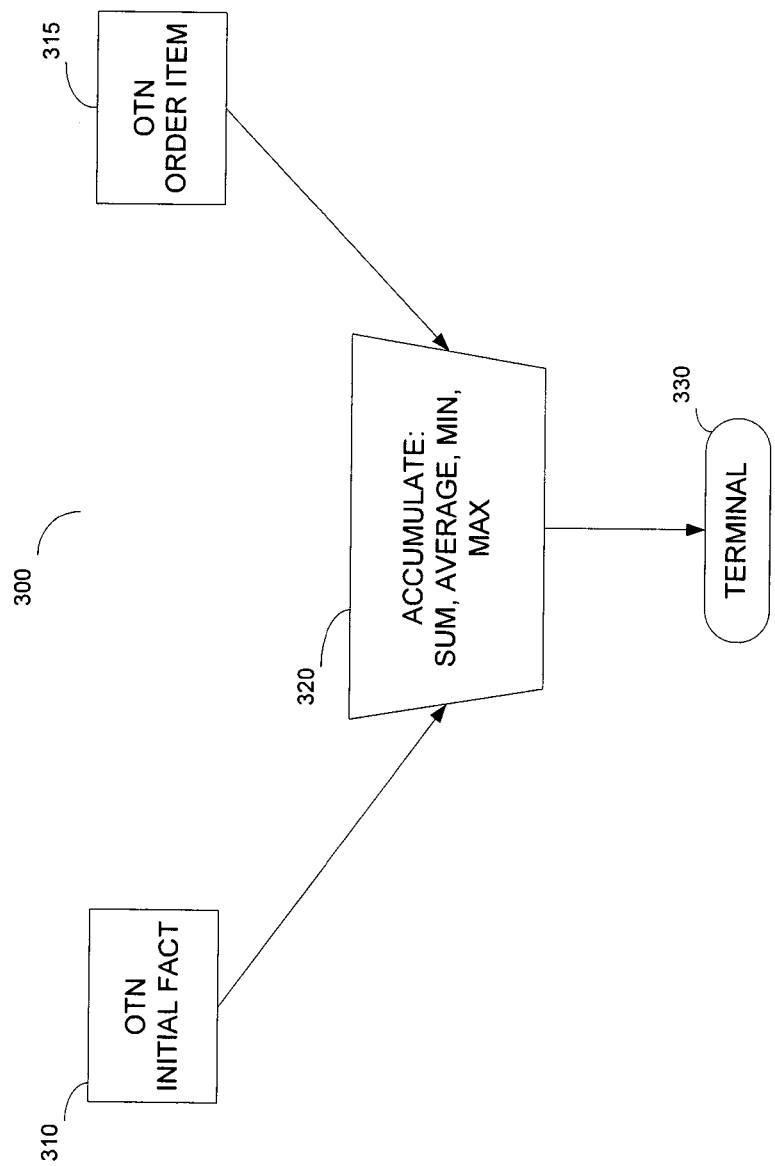
FIG. 3 illustrates one embodiment of an accumulate node to support multi-result set calculation in a Rete network.

FIG. 3 illustrates one embodiment of a multi-result set calculation node for the above rule. The inputs of the multi-result set calculation node 320 are connected to a first object type node 310 and a second object type node 315 in a network 300. The output of the multi-result set calculation node 320 is connected to a terminal node 330. The multi-result set calculation node 320 is implemented using an accumulate node. The first and second object type nodes 310 and 315 propagate an initial fact and an order item, respectively, to the multi-result set calculation node 320. The multi-result set calculation node 320 would generate a set of results that would have to be added to the matching tuple. For that set of results, a multi-dimensional tuple can be used to hold the set of results. In some embodiments, the multi-dimensional tuple has a set of elements. The multi-dimensional tuple may further include a distinct index for each of the elements. Like the offset in a conventional tuple, the index distinctly identifies an element of the multi-dimensional tuple. Each element of the multi-dimensional tuple is a single fact or a tree structure for holding a set of related facts. As such, the same tuple slot can store all calculation results and they would be readily accessible. So for instance, the exemplary rule and facts described above would generate the tuple illustrated in FIG. 4 in one embodiment.

Figure 4:
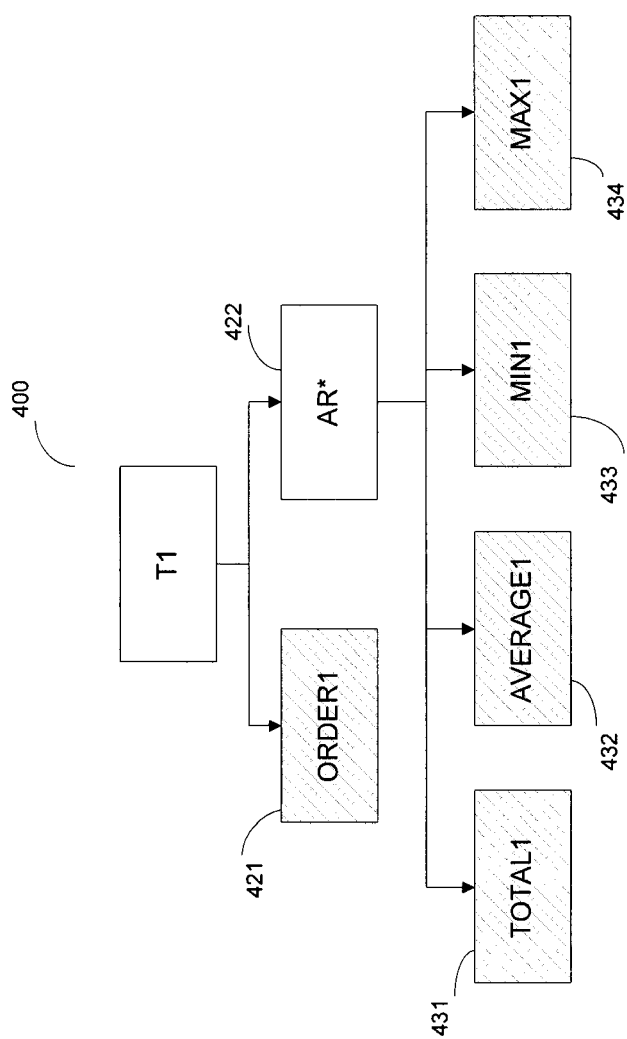
FIG. 4 illustrates one embodiment of a multi-dimensional tuple.

FIG. 4 illustrates one embodiment of a multi-dimensional tuple. The multi-dimensional tuple 400 includes five leaf nodes 421, 431, 432, 433, and 434. The leaf node 421 contains the order item, order1. The node AR* 422 is the parent node of the other four leaf nodes 431-434. The leaf nodes 431-434 contain the actual values of the calculation result (i.e., total, average, minimum, and maximum, respectively).

Optionally, one could also bind and constrain the results of the accumulate pattern by using a "virtual" result type. In the current example, the "virtual" result type is called AccumulateResult, but any name could be used in other embodiments. Continuing with the current example, suppose the exemplary rule further requires that only orders in which the minimum item value is greater than 100 and the average is lower than 300 can be matched. Then the exemplary rule may be re-written as follows:

```
rule "Order statistics"
when
    $order : Order( )
    AccumulateResult( $min > 100, $avg < 300 ) from accumulate(
        OrderItem( orderId == $order.id, $amt : amount ),
            $total : sum ( $amt ),
            $avg : average( $amt ),
            $min : min( $amt ),
            $max : max( $amt ) )
then
    // other operations with $total, $avg, $min, $max
end
```

Figure 5:
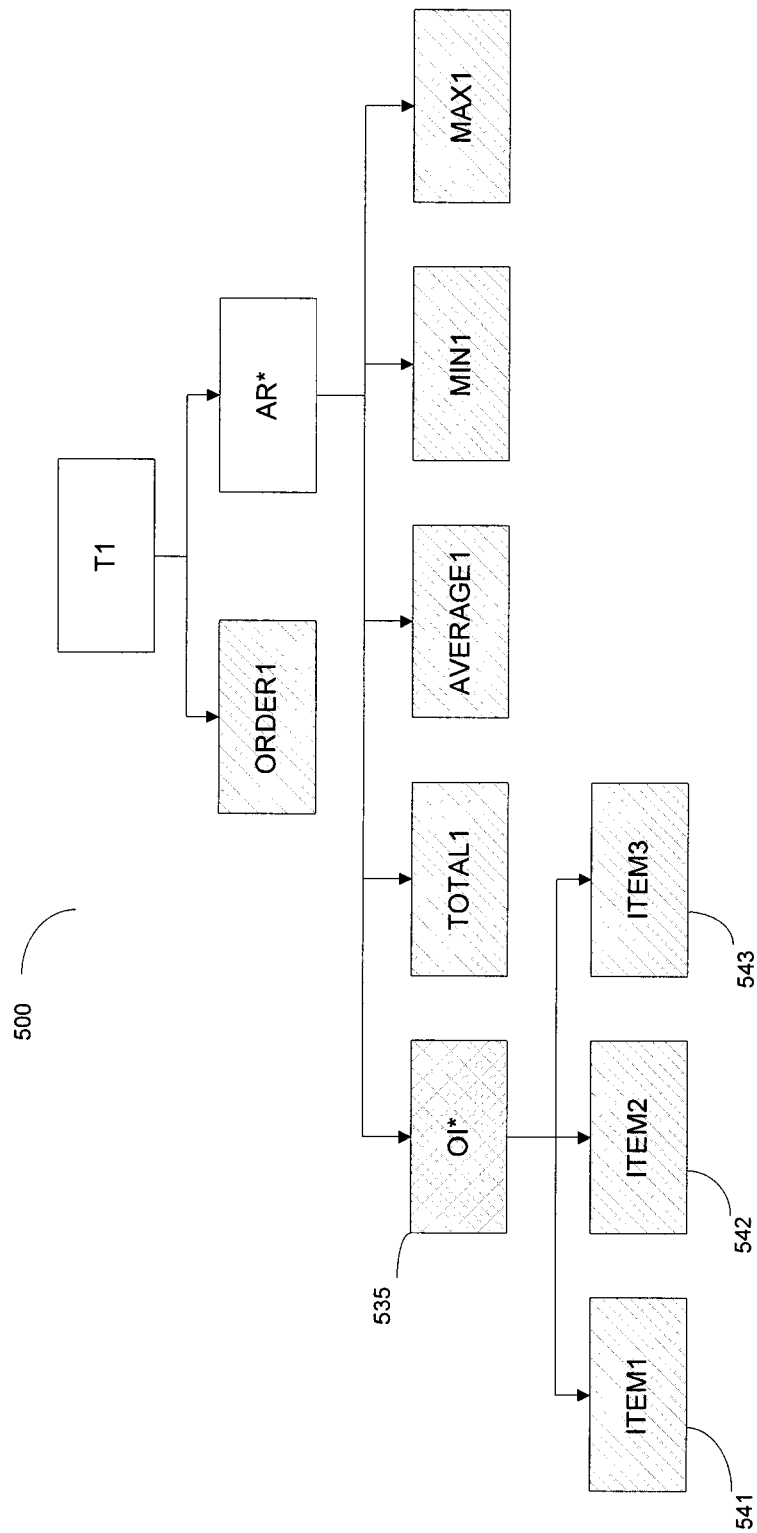
FIG. 5 illustrates a second embodiment of a multi-dimensional tuple.

In some embodiments, the matched tuple also contains all items matched for the calculations. FIG. 5 illustrates another embodiment of such a tuple for the above example. In addition to the nodes shown in FIG. 4, the tuple 500 has an extra node, OI* 535, which is the parent node of three additional leaf nodes 541-543. Each of the leaf nodes 541-543 contains an item matched for the above calculations.

In order to accommodate multiple calculations in the accumulate node, changes are made to the accumulate node algorithm in some embodiments. The changes made in some embodiments are split into six parts in the following discussions, corresponding to six different scenarios, namely, left tuple assertion, left tuple modification, left tuple retraction, right tuple assertion, right tuple modification, and right tuple retraction. It should be appreciated that the changes described below may be varied or optimized in other embodiments.

Figure 6:
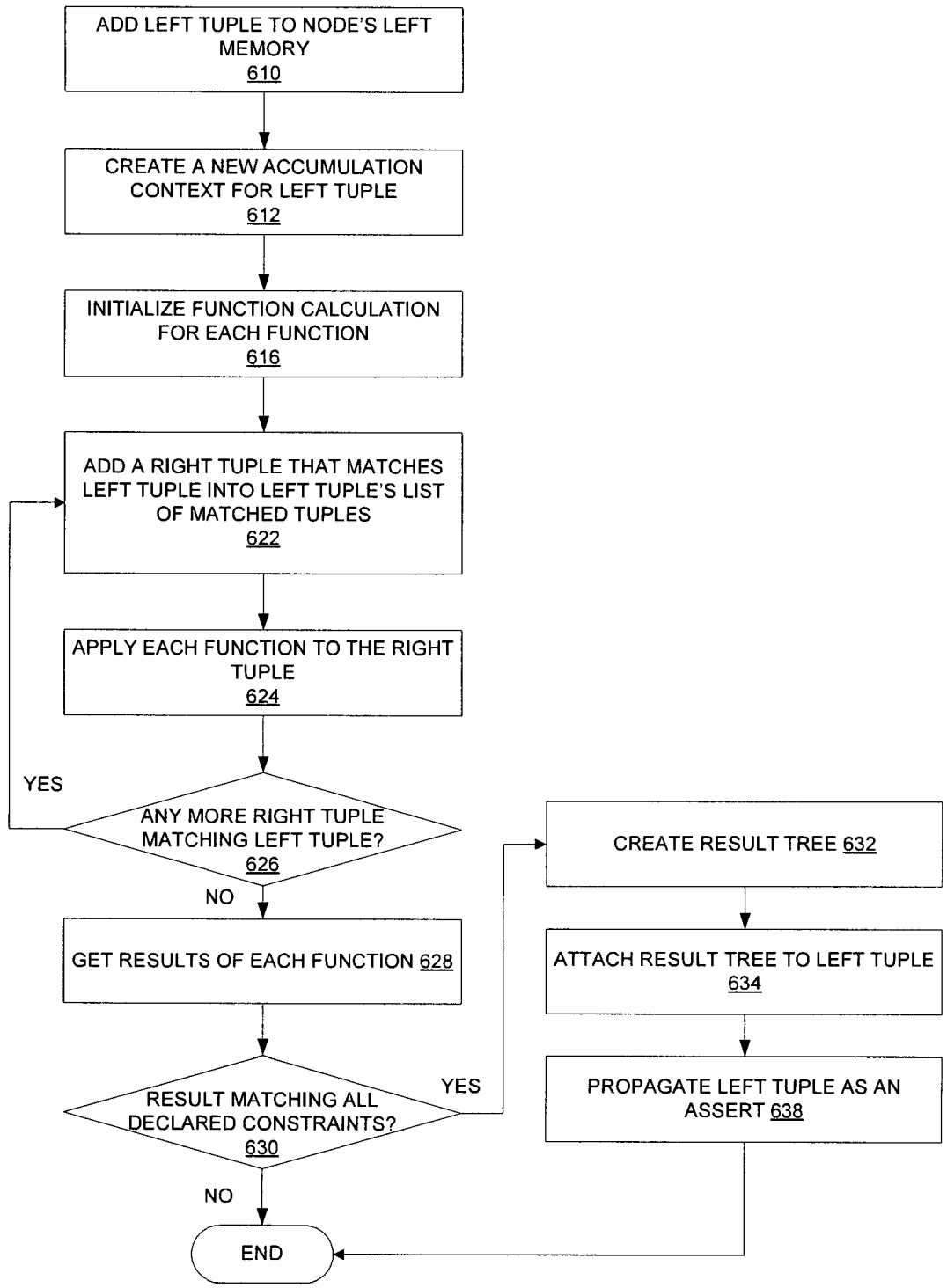
FIG. 6 illustrates one embodiment of a method to support left tuple assertion.

FIG. 6 illustrates one embodiment of a method to support left tuple assertion in an accumulate node extended to support multiple calculations. The method can be performed by a rule engine executable on a computing machine, such as the one described above. Initially, the rule engine adds a left tuple to the accumulate node's left memory (processing block 610). Then the rule engine creates a new accumulation context for the left tuple (processing block 612). For each function, the rule engine initializes the function calculation (processing block 616).

In some embodiments, the rule engine adds a right tuple from the accumulate node's right memory that matches the left tuple to the left tuple's list of matched tuples (processing block 622). Then the rule engine applies each function to the right tuple (processing block 624). Then the rule engine checks if there is any more right tuple in the right memory matching the left tuple (processing block 626). If there is, then the rule engine returns to processing block 622 to repeat the above operations. Otherwise, the rule engine gets result of each function (processing block 628) and checks if the result matches the declared constraints, if any (processing block 630). If the result does not match the declared constraints, then the rule engine ends the process. Otherwise, if all constraints are matched, the rule engine creates a result tree (processing block 632), attaches the result tee to the left tuple (processing block 634), and propagates the left tuple as an assert (processing block 638).

Figure 7:
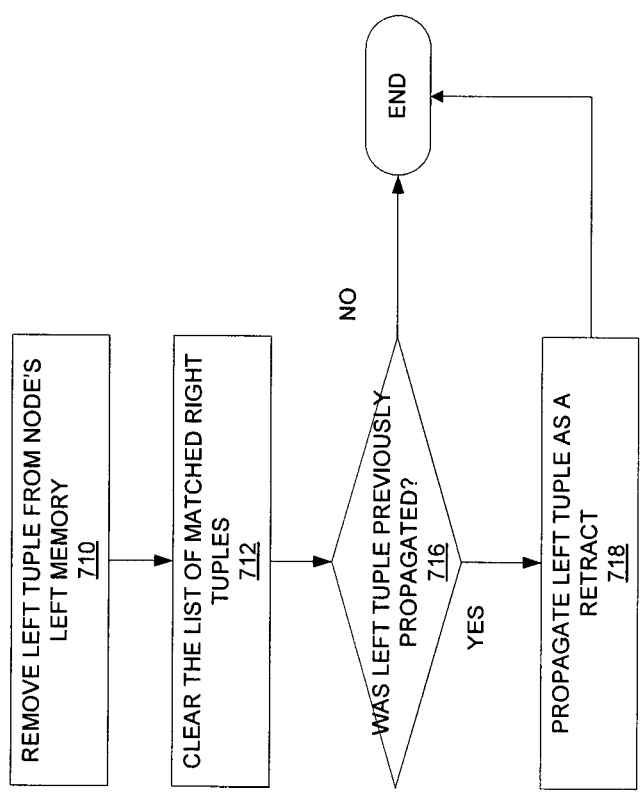
FIG. 7 illustrates one embodiment of a method to support left tuple retraction.

FIG. 7 illustrates one embodiment of a method to support left tuple retraction in an accumulate node extended to support multiple calculations. The method can be performed by a rule engine executable on a computing machine, such as the one described above. Initially, the rule engine removes a left tuple from the accumulate node's left memory (processing block 710). Then the rule engine clears the left tuple's list of matched right tuples (processing block 712). Next, the rule engine checks if the left tuple was previously propagated (processing block 716). If not, then the process ends. Otherwise, the rule engine propagates the left tuple as a retract (processing block 718).

Figure 8A:
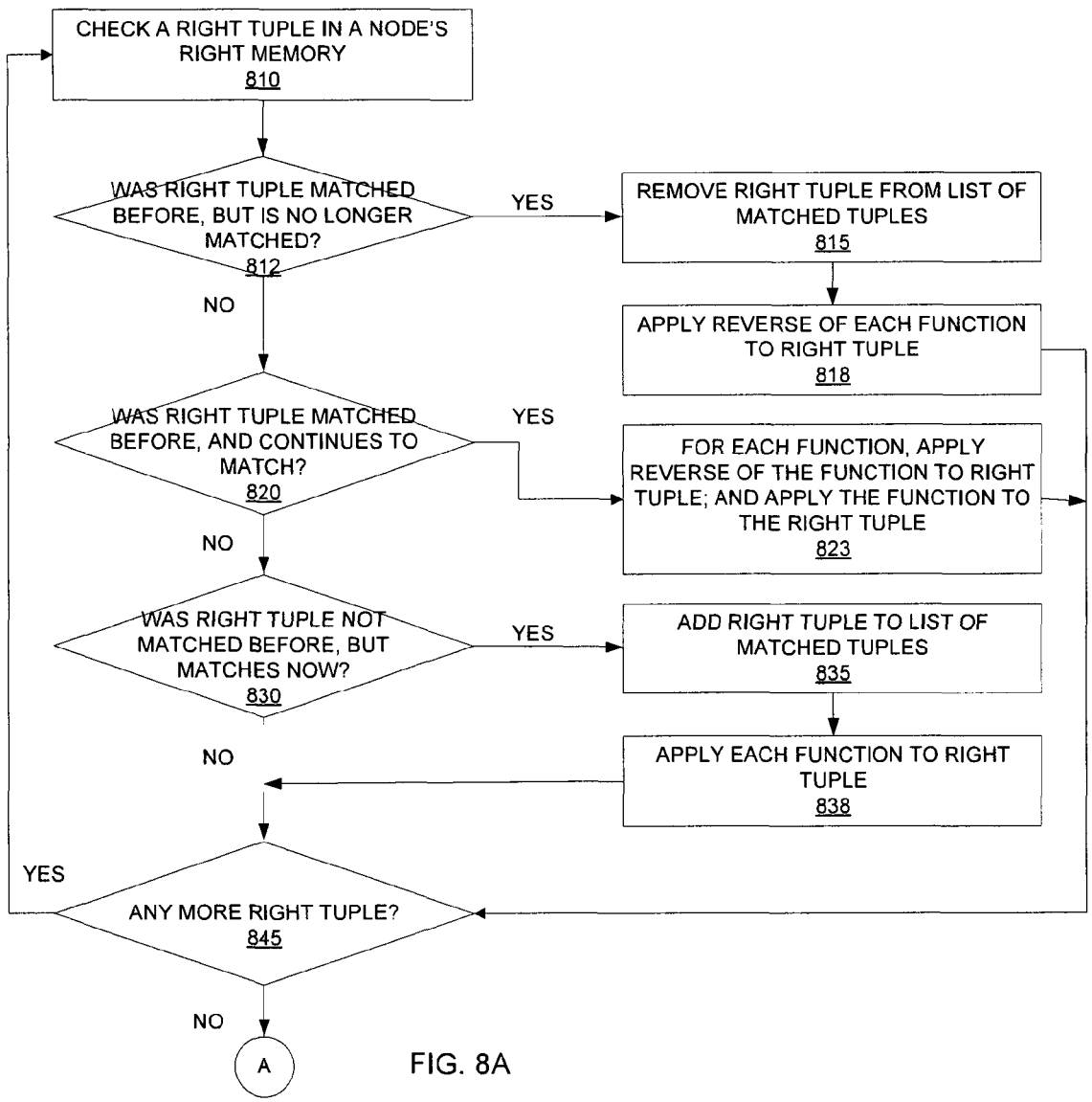
FIGS. 8A and 8B illustrate one embodiment of a method to support left tuple modification.
Figure 8B:
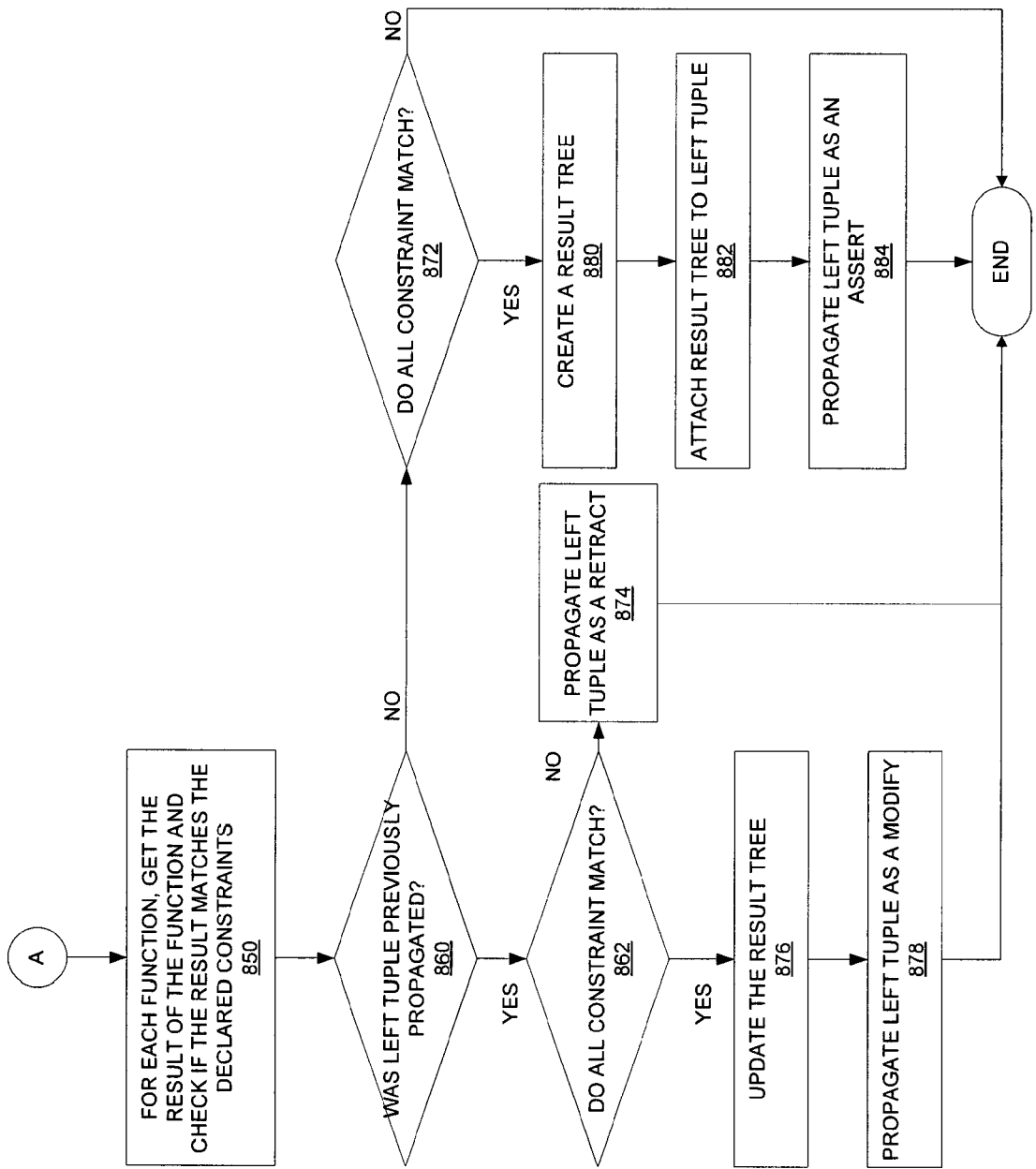

FIGS. 8A and 8B illustrate one embodiment of a method to support left tuple modification in an accumulate node extended to support multiple calculations. The method can be performed by a rule engine executable on a computing machine, such as the one described above. Referring to FIG. 8A, the rule engine starts by checking a right tuple in an accumulate node's right memory (processing block 810). Then the rule engine determines if the right tuple matched before, but no longer matches (processing block 812). If so, then the rule engine removes the right tuple from the left tuple's list of matched tuples (processing block 815) and applies reverse of each function to the right tuple (processing block 818). The rule engine then transitions to block 845. Otherwise, the rule engine determines if the right tuple matched before and continues to match (processing block 820). If so, then for each function, the rule engine applies reverse of the function to the right tuple, and applies the function to the right tuple as well (processing block 823). The rule engine then transitions to block 845. Otherwise, the rule engine determines if the right tuple was not matched before, but matches now (processing block 820). If so, then the rule engine adds the right tuple to the list of matched tuples (processing block 835) and applies each function to the right tuple (processing block 838). The rule engine then transitions to block 845. Otherwise, the rule engine transitions directly to block 845. At block 845, the rule engine checks if there is any more right tuple in the node's right memory (processing block 845). If there is, then the rule engine returns to block 810 to repeat the above operations. Otherwise, the rule engine transitions to block 850.

Referring to FIG. 8B, for each function, the rule engine gets the result of the function and checks if the result matches the declared constraints (processing block 850). The rule engine determines if the left tuple was previously propagated (processing block 860). If the left tuple was not previously propagated, then the rule engine checks if all constraints are matched (processing block 872). If all constraints are matched, then the rule engine creates a result tree (processing block 880), attaches the result tree to the left tuple (processing block 882), and propagates the left tuple as an assert (processing block 884). Otherwise, if not all constraints are matched, then the process ends.

If the rule engine has determined that the left tuple was previously propagated at block 860, then the rule engine further determines if the result matches the declared constraints (processing block 862). If all constraints are matched, then the rule engine updates the result tree (processing block 876) and propagates the left tuple as a modify (processing block 878). Then the process ends. Otherwise, if not all constraints are matched, then the rule engine propagates the left tuple as a retract (processing block 874), and then ends the process.

Figure 9:
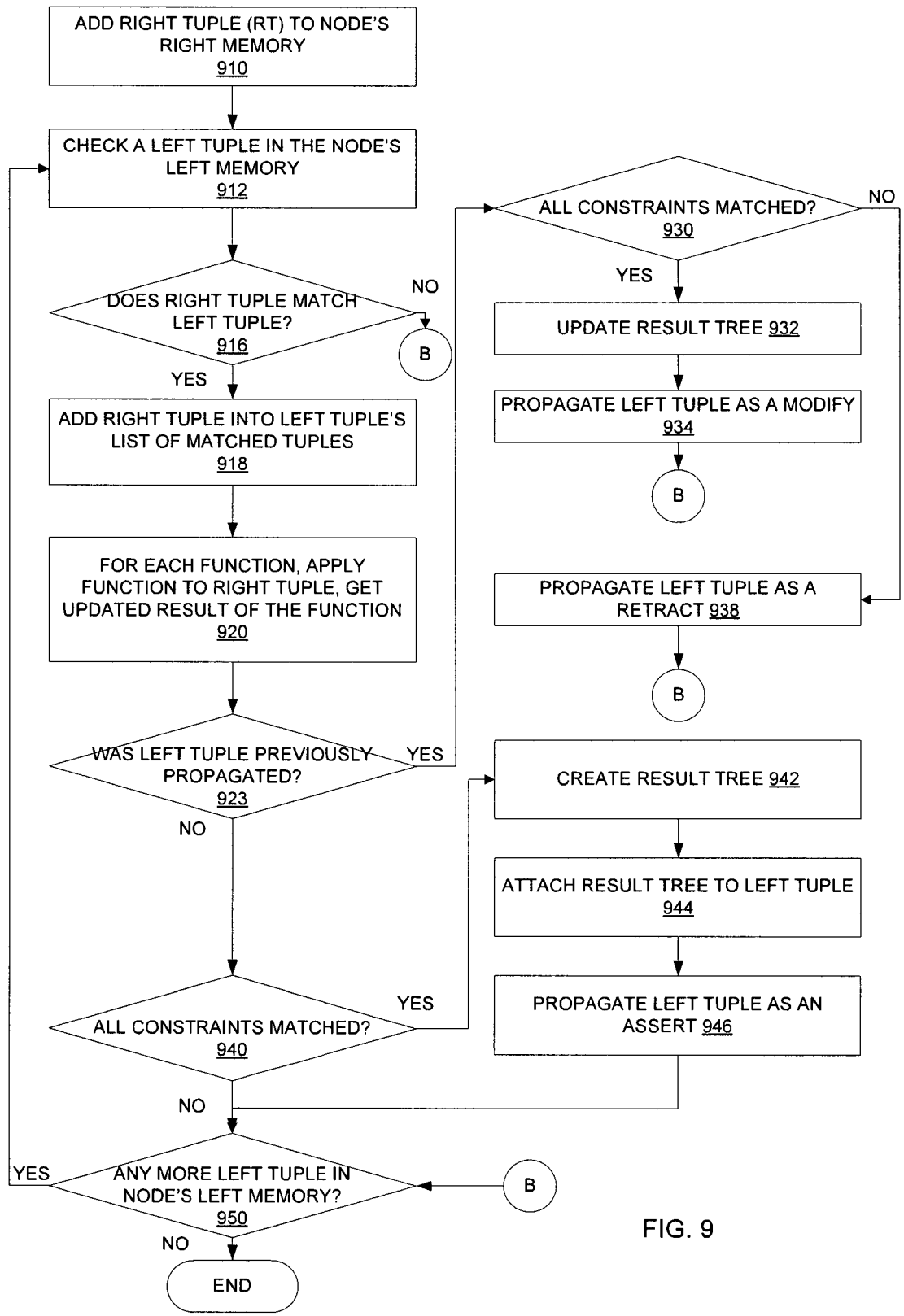
FIG. 9 illustrates one embodiment of a method to support right tuple assertion.

FIG. 9 illustrates one embodiment of a method to support right tuple assertion in an accumulate node extended to support multiple calculations. The method can be performed by a rule engine executable on a computing machine, such as the one described above. Initially, the rule engine adds a right tuple to an accumulate node's right memory (processing block 910). The rule engine checks a left tuple in the accumulate node's left memory (processing block 912) and determines if the right tuple matches the left tuple (processing block 916). If the right tuple does not match the left tuple, then the rule engine transitions to block 950. Otherwise, the rule engine adds the right tuple into the left tuple's list of matched tuples (processing block 918). For each function, the rule engine applies the function to the right tuple and gets updated result of the function (processing block 920). The rule engine checks if the left tuple was previously propagated (processing block 923). If so, the rule engine checks if all constraints are matched (processing block 930). If all constraints are matched, the rule engine updates a result tree (processing block 932) and propagates the left tuple as a modify (processing block 934). Then the rule engine transitions to block 950. Otherwise, if not all constraints are matched, then the rule engine propagates the left tuple as a retract (processing block 938) and then transitions to block 950.

If the left tuple was not previously propagated, then the rule engine checks if all constraints are matched (processing block 940). If so, then the rule engine creates a result tree (processing block 942), attaches the result tree to the left tuple (processing block 944), and then propagates the left tuple as an assert (processing block 946). The rule engine then transitions to block 950. If not all constraints are matched, the rule engine transitions directly to block 950.

At block 950, the rule engine checks if there is any more left tuple in the node's left memory. If there is, then the rule engine returns to block 912 to repeat the above operations for the next left tuple. Otherwise, the process ends.

Figure 10:
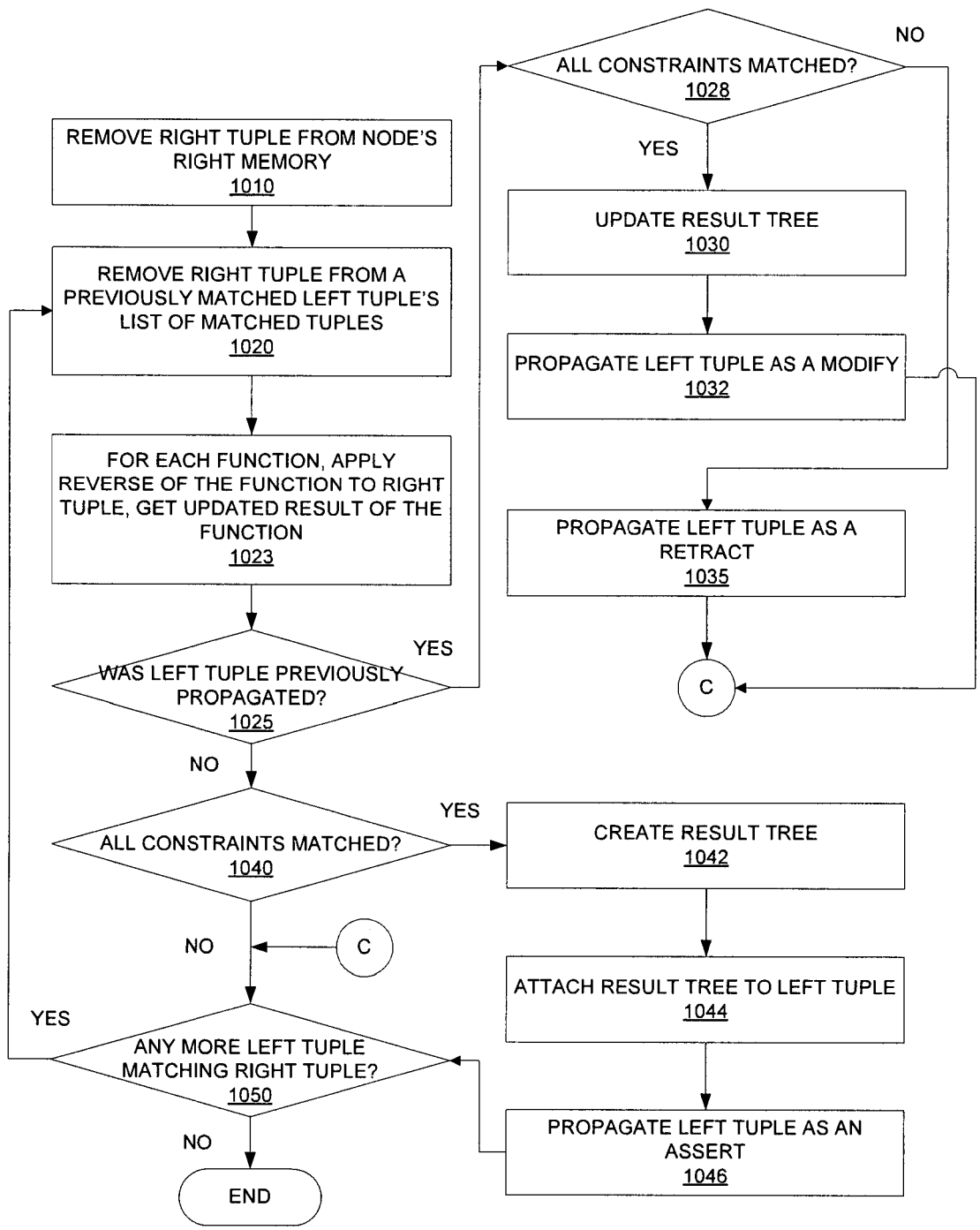
FIG. 10 illustrates one embodiment of a method to support right tuple retraction.

FIG. 10 illustrates one embodiment of a method to support right tuple retraction in an accumulate node extended to support multiple calculations. The method can be performed by a rule engine executable on a computing machine, such as the one described above. Initially, the rule engine removes a right tuple from an accumulate node's right memory (processing block 1010). For each left tuple previously matched, the rule engine removes the right tuple from a previously matched left tuple's list of matched tuples (processing block 1020). For each function, the rule engine applies reverse of the function to the right tuple and gets updated result of the function (processing block 1023). Then the rule engine checks if the left tuple was previously propagated (processing block 1025). If so, the rule engine checks if all constraints are matched (processing block 1028). If so, the rule engine updates a result tree (processing block 1030) and propagates the left tuple as a modify (processing block 1032). Then the rule engine transitions to block 1050. Otherwise, if not all constraints are matched, the rule engine propagates the left tuple as a modify (processing block 1035) and transitions to block 1050.

If the left tuple was not previously propagated, then the rule engine checks if all constraints are matched (processing block 1040). If so, the rule engine creates a result tree (processing block 1042), attaches the result tree to the left tuple (processing block 1044), and propagates the left tuple as an assert (processing block 1046). Then the rule engine transitions to block 1050. Otherwise, if not all constraints are matched, then the rule engine transitions directly to block 1050.

At block 1050, the rule engine checks if there is any more left tuple in the node's left memory matching the right tuple. If so, then the rule engine returns to block 1020 to repeat the above operations for the left tuple. Otherwise, the process ends.

Figure 11A:
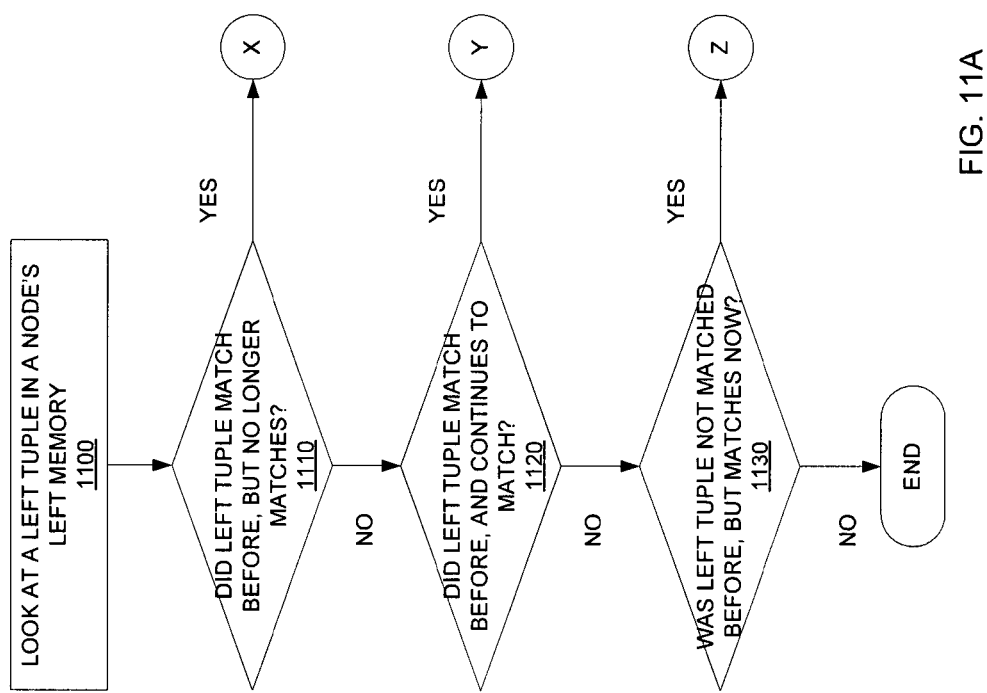

FIGS. 11A-11D illustrate one embodiment of a method to support right tuple modification in an accumulate node extended to support multiple calculations. The method can be performed by a rule engine executable on a computing machine, such as the one described above. Further, the rule engine performs the following operations on each left tuple in the accumulate node's left memory. Referring to FIG. 11A, the rule engine first looks at a left tuple in the accumulate node's left memory (processing block 1100) and determines if the left tuple was matched before, but no longer matches (processing block 1110). If so, then the rule engine transitions to block 1112. Otherwise, the rule engine determines if the left tuple was matched before, and continues to match (processing block 1120). If so, then the rule engine transitions to block 1140. Otherwise, the rule engine determines if the left tuple was not matched before, but matches now (processing block 1130). If so, then the rule engine transitions to block 1160. Otherwise, the rule engine ends the process.

Figure 11B:
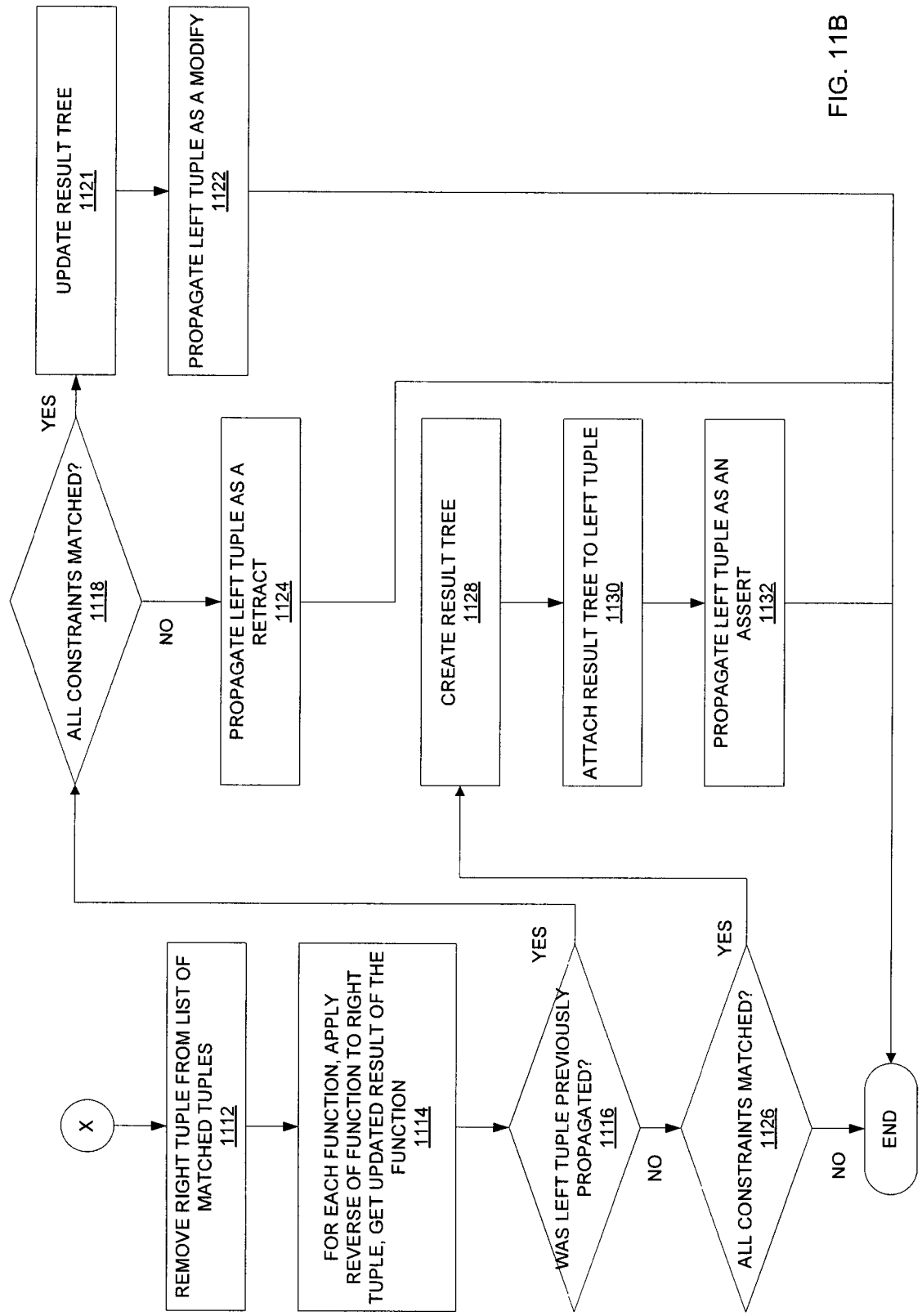

Referring to FIG. 11B, the rule engine removes the right tuple from a list of matched tuples of the left tuple (processing block 1112) after determining that the left tuple was matched before but no longer matches. Then for each function, the rule engine applies reverse of the function to the right tuple and gets updated result of the function (processing block 1114). Then rule engine then checks if the left tuple was previously propagated (processing block 1116). If not, the rule engine checks if all constraints are matched (processing block 1126). If so, the rule engine creates a result tree (processing block 1128), attaches the result tree to the left tuple (processing block 1130), and propagates the left tuple as an assert (processing block 1132). Otherwise, if not all constraints are matched, then the rule engine ends the process.

If the left tuple was previously propagated, then the rule engine checks if all constraints are matched (processing block 1118). If so, the rule engine updates the result tree (processing block 1121) and propagates the left tuple as a modify (processing block 1122). Then the rule engine ends the process. Otherwise, if not all constraints are matched, the rule engine propagates the left tuple as a retract (processing block 1124) and ends the process.

Figure 11C:
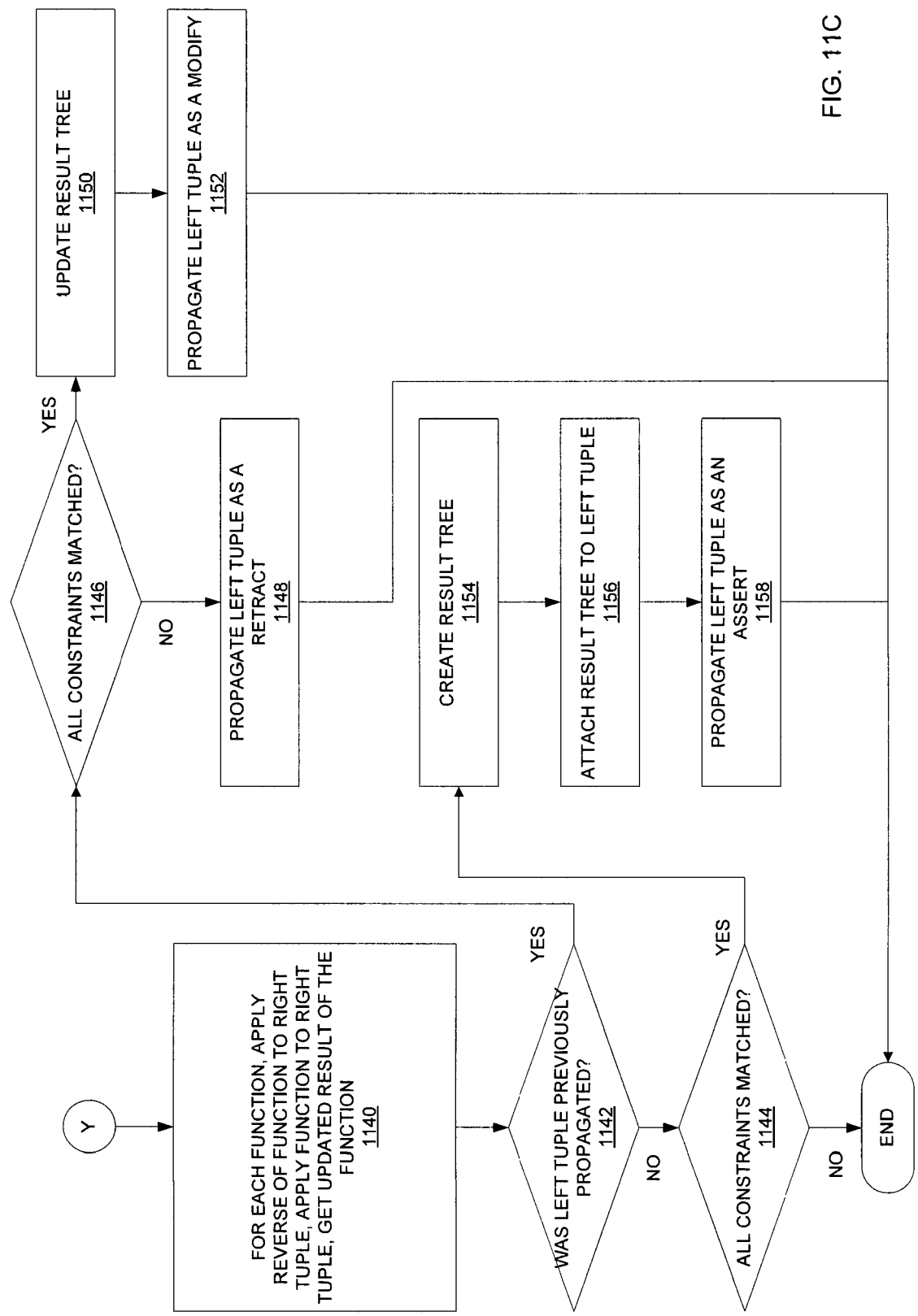

As mentioned above, the rule engine transitions to block 1140 after determining that the left tuple was matched before and continues to match. Referring to FIG. 11C, for each function, the rule engine applies reverse of the function to the right tuple, applies the function to the right tuple, and gets updated result of the function (processing block 1140). Then the rule engine checks if the left tuple was previously propagated (processing block 1142). If not, the rule engine checks if all constraints are matched (processing block 1144). If so, the rule engine creates a result tree (processing block 1154), attaches the result tree to the left tuple (processing block 1156), and propagates the left tuple as an assert (processing block 1158). Otherwise, if not all constraints are matched, then the rule engine ends the process.

If the left tuple was previously propagated, then the rule engine checks if all constraints are matched (processing block 1146). If so, the rule engine updates the result tree (processing block 1150) and propagates the left tuple as a modify (processing block 1152). Then the rule engine ends the process. Otherwise, if not all constraints are matched, the rule engine propagates the left tuple as a retract (processing block 1148) and ends the process.

As mentioned above, the rule engine transitions to block 1160 after determining that the left tuple was not matched before but the left tuple matches now. Referring to FIG. 11D, the rule engine adds the right tuple to the left tuple's list of matched tuples (processing block 1160). For each function, the rule engine applies the function to the right tuple and gets updated result of the function (processing block 1162). Then the rule engine checks if all constraints are matched (processing block 1164). If not, then the rule engine ends the process. Otherwise, the rule engine creates a result tree (processing block 1170), attaches the result tree to the left tuple (processing block 1172), and propagates the left tuple as an assert (processing block 1174). Then the rule engine ends the process.

Figure 12:
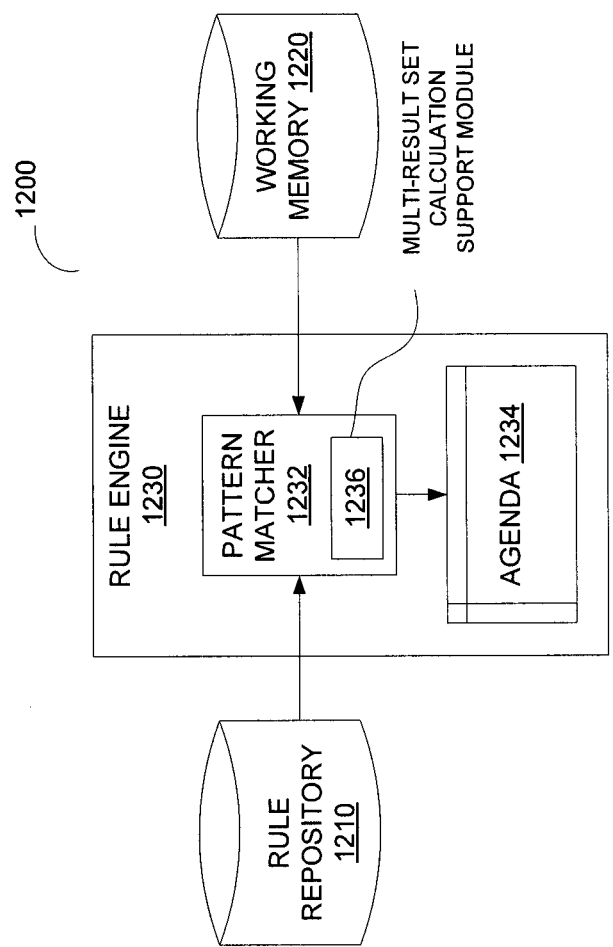
FIG. 12 shows one embodiment of a rule engine usable with some embodiments of the present invention.

FIG. 12 shows one embodiment of a rule engine usable to implement some embodiments of the present invention. In some embodiments, a rule engine 1230 is operatively coupled to a rule repository 1210 and a working memory 1220. The rule repository 1210 is a logical space that stores a rule set having a number of rules. The rule repository 1210 may also be referred to as a production memory. The working memory 1220 is a logical space that stores data objects (also referred to as facts) that have been asserted. The rule repository 1210 and the working memory 1220 can be implemented using one or more computer-readable storage devices, such as optical disks, CD-ROMs, and magnetic-optical disks; read-only memories (ROMs); random access memories (RAMs); EPROMs; EEPROMs; magnetic or optical cards; etc.

In some embodiments, the rule engine 1230 includes a pattern matcher 1232 and an agenda 1234. The pattern matcher 1232 generates a network (such as a Rete network) to evaluate the rules from the rule repository 1210 against the data objects from the working memory 1220. One or more of the nodes within the network are multiple-input nodes, such as a beta node. A multi-result set calculation support module 1236 within the pattern matcher 1232 creates a single multi-result set calculation node for each rule requiring multiple calculations to be executed on the same set of facts. Details of some examples of implementing a multi-result set calculation node using a rule engine have been described above.

As the data objects propagating through the network, the pattern matcher 1232 evaluates the data objects against the rules. Fully matched rules result in activations, which are placed into the agenda 1234. The rule engine 1230 may iterate through the agenda 1234 to execute or fire the activations sequentially. Alternatively, the rule engine 1230 may execute or fire the activations in the agenda 1234 randomly.

Figure 13:
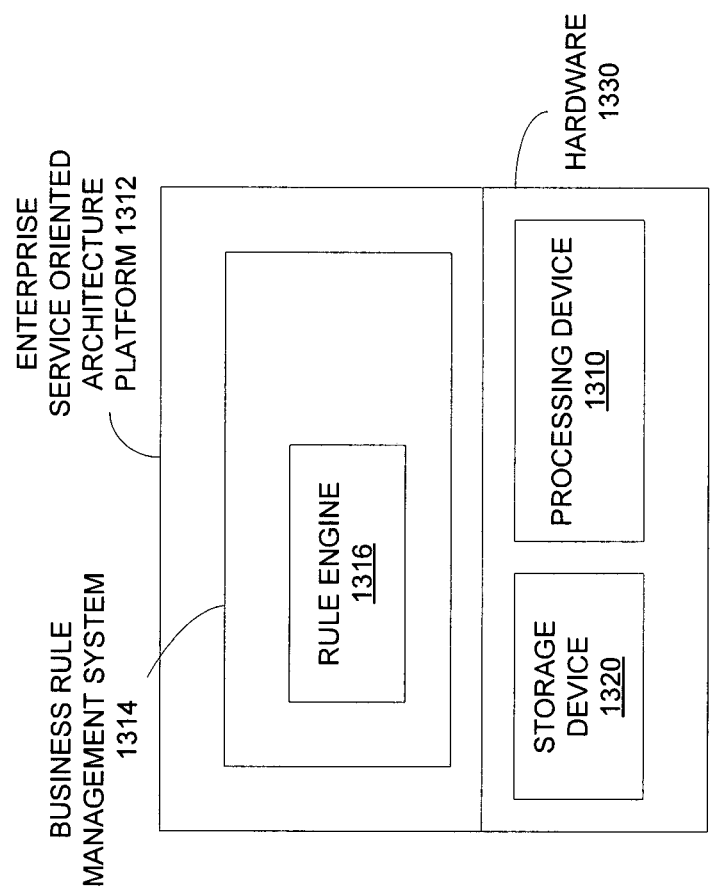
FIG. 13 shows one embodiment of an enterprise service oriented architecture (SOA) platform.

FIG. 13 shows one embodiment of enterprise service oriented architecture (SOA) platform usable in some embodiments of the invention. In general, the enterprise SOA platform 1312 can integrate applications, services, transactions, and business components into automated business processes. An enterprise can use the enterprise SOA platform 1312 to integrate services, handle business events, and automate business processes more efficiently, linking information technology resources, data, services, and applications across the enterprise. For example, a bank may deploy the enterprise SOA platform 1312 to integrate various banking services (e.g., mortgage, personal banking, etc.), handle business events (e.g., opening and closing of a bank account, overdraft, etc.), and automate business processes (e.g., direct deposit, payment of bills, etc.).

The enterprise SOA platform 1312 may include various middleware components, such as a business rule management system (BRMS) 1314, which further includes a rule engine 1316. One embodiment of the rule engine 1316 is illustrated in FIG. 12. The rule engine 1316 may be operable to evaluate data against rules (e.g., business rules), including rules with repetitions. In some embodiments, the rule engine 1316 may create multi-dimensional tuples to store facts that match a rule with repetitions during evaluation of rules. Some embodiments of the methods to create and use multi-dimensional tuples have been discussed above.

The enterprise SOA platform 1312 is executable on hardware 1330, which may include a processing device 1310. The processing device 1310 can include one or more general purpose processing devices, such as a microprocessor, a central processing unit, or the like. More particularly, the processing device 1310 may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. The processing device 1310 may also be one or more special-purpose processing devices such as an application specific integrated circuit (ASIC), a field programmable gate array (FPGA), a digital signal processor (DSP), network processor, or the like. The hardware 1330 further includes a storage device 1320.

In some embodiments, the storage device 1320 may include one or more computer-accessible storage media (also known as computer-readable storage media). Some examples of computer-accessible storage media include any type of disk, such as optical disks, CD-ROMs, and magnetic-optical disks; read-only memories (ROMs); random access memories (RAMs); EPROMs; EEPROMs; magnetic or optical cards; or any type of media suitable for storing electronic instructions and/or data. The storage device 1320 can store instructions executable by the processing device 1310, as well as data usable by the processing device 1310.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "compiling" or "creating" or "performing" or "constraining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of a method and an apparatus to support multi-result set calculation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
compiling, by a rule engine running on a processing device, a plurality of rules to build a network to evaluate facts against the plurality of rules, wherein a rule of the plurality of rules requires multiple calculations to be executed for a set of facts; and
creating, by the rule engine, a single multi-result set calculation node for the rule, the multi-result set calculation node to generate a set of results and to add the set of results to a tuple to be propagated to a second node connected to an output of the multi-result set calculation node.

2. The method of claim 1, wherein the tuple comprises a multi-dimensional tuple.

3. The method of claim 1, wherein an element of the tuple comprises a tree structure having a plurality of leaf nodes, and the plurality of leaf nodes contain the set of results.

4. The method of claim 1, further comprising:
performing, by the rule engine, the multiple calculations on the facts at the multi-result set calculation node.

5. The method of claim 1, further comprising:
constraining, by the rule engine, results of the multiple calculations performed at the multi-result set calculation node using a virtual result type.

6. The method of claim 1, wherein the rule is a business rule.

7. The method of claim 1, wherein the rule engine comprises a Rete rule engine.

8. An apparatus comprising:
a storage device to store a plurality of rules, wherein a rule of the plurality of rules requires multiple calculations to be executed for a set of facts; and
a processing device coupled to the storage device, to compile the plurality of rules to build a network to evaluate facts against the plurality of rules and to create a single multi-result set calculation node for the rule, the multi-result set calculation node to generate a set of results and to add the set of results to a tuple to be propagated to a second node connected to an output of the multi-result set calculation node.

9. The apparatus of claim 8, wherein the tuple comprises a multi-dimensional tuple.

10. The apparatus of claim 8, wherein an element of the tuple comprises a tree structure having a plurality of leaf nodes, and the plurality of leaf nodes contain the set of results.

11. The apparatus of claim 8, the processing device to perform the multiple calculations on the facts at the multi-result set calculation node.

12. The apparatus of claim 8, wherein the processing device results of the multiple calculations performed at the multi-result set calculation node using a virtual result type.

13. The apparatus of claim 8, wherein the plurality of rules comprise a plurality of business rules.

14. The apparatus of claim 8, wherein the network comprises a Rete network.

15. A non-transitory computer-readable storage medium embodying instructions that, when executed by a processing device, will cause the processing device to perform operations comprising:
compiling, by a rule engine running on the processing device, a plurality of rules to build a network to evaluate facts against the plurality of rules, wherein a rule of the plurality of rules requires multiple calculations to be executed for a set of facts; and
creating, by the rule engine, a single multi-result set calculation node for the rule, the multi-result set calculation node to generate a set of results and to add the set of results to a tuple to be propagated to a second node connected to an output of the multi-result set calculation node.

16. The computer-readable storage medium of claim 15, wherein the tuple comprises a multi-dimensional tuple.

17. The computer-readable storage medium of claim 15, wherein an element of the tuple comprises a tree structure having a plurality of leaf nodes, and the plurality of leaf nodes contain the set of results.

18. The computer-readable storage medium of claim 15, wherein the operations further comprise:
   performing, by the rule engine, the multiple calculations on the facts at the multi-result set calculation node.

19. The computer-readable storage medium of claim 15, wherein the operations further comprise:
   constraining, by the rule engine, results of the multiple calculations performed at the multi-result set calculation node using a virtual result type.

20. The computer-readable storage medium of claim 15, wherein the rule is a business rule and the rule engine comprises a Rete rule engine.

* * * * *